US009007185B2

(12) United States Patent
Ott et al.

(10) Patent No.: US 9,007,185 B2
(45) Date of Patent: Apr. 14, 2015

(54) METHOD AND DEVICE FOR PROGRAMMING A PLURALITY OF KEYS TO AN AUTHORIZATION DEVICE OF A VEHICLE

(75) Inventors: Tobias Ott, Wolnzach (DE); Patrick Sassmannshausen, Boehmfeld (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/124,922

(22) PCT Filed: Jun. 5, 2012

(86) PCT No.: PCT/EP2012/002389
§ 371 (c)(1),
(2), (4) Date: Mar. 4, 2014

(87) PCT Pub. No.: WO2012/167915
PCT Pub. Date: Dec. 13, 2012

(65) Prior Publication Data
US 2014/0184396 A1  Jul. 3, 2014

(30) Foreign Application Priority Data
Jun. 9, 2011  (DE) .......................... 10 2011 103 674

(51) Int. Cl.
G08C 19/28  (2006.01)
G08C 19/00  (2006.01)
B60R 25/20  (2013.01)
G07C 9/00  (2006.01)

(52) U.S. Cl.
CPC ............ *G08C 19/00* (2013.01); *B60R 25/2072* (2013.01); *G07C 9/00309* (2013.01); *G07C 9/00111* (2013.01); *G07C 9/00674* (2013.01)

(58) Field of Classification Search
CPC ............... G08C 19/00; B60R 25/2072; G07C 9/00309; G07C 9/00111; G07C 9/00674
USPC ................ 340/1.1, 12.1, 12.22, 12.23, 126.1, 340/426.1, 426.13, 426.14, 426.16, 426.17; 180/187–189
See application file for complete search history.

(56) References Cited

U.S. PATENT DOCUMENTS 6,317,035 B1 * 11/2001 Berberich et al. ....... 340/426.13

FOREIGN PATENT DOCUMENTS

| DE | 19941350 | 10/2000 |
|---|---|---|
| DE | 10112573 | 10/2002 |

(Continued)

OTHER PUBLICATIONS

WIPO International Preliminary Report on Patentability with English Language Translation for PCT/EP2012/002389, mailed Dec. 27, 2013, 19 pages.

(Continued)

*Primary Examiner* — Steven Lim
*Assistant Examiner* — Sisay Yacob
(74) *Attorney, Agent, or Firm* — Staas & Halsey LLP

(57) ABSTRACT

A method and apparatus teach a plurality of keys to an authorization device in a vehicle. The keys that are in a reception range of a transmission unit of the authorization device receive a test signal from the authorization device. The respective key ascertains a key-specific time window from at least one signal parameter of the test signal that is dependent on the physical location of the key, during which the respective key transmits a response signal that can be received by the transmission unit and recorded by the authorization device.

11 Claims, 1 Drawing Sheet

(56) References Cited

FOREIGN PATENT DOCUMENTS

| | | |
|---|---|---|
| DE | 102005017458 | 11/2005 |
| DE | 102008011700 | 9/2009 |
| DE | 102008052239 | 4/2010 |
| DE | 102011103674.5 | 6/2011 |
| EP | 1041224 | 10/2000 |
| EP | 1302374 | 4/2003 |
| WO | PCT/EP2012/002389 | 6/2012 |

OTHER PUBLICATIONS

English Language International Search Report for PCT/EP2012/002389, mailed Aug. 20, 2012, 2 pages.

* cited by examiner

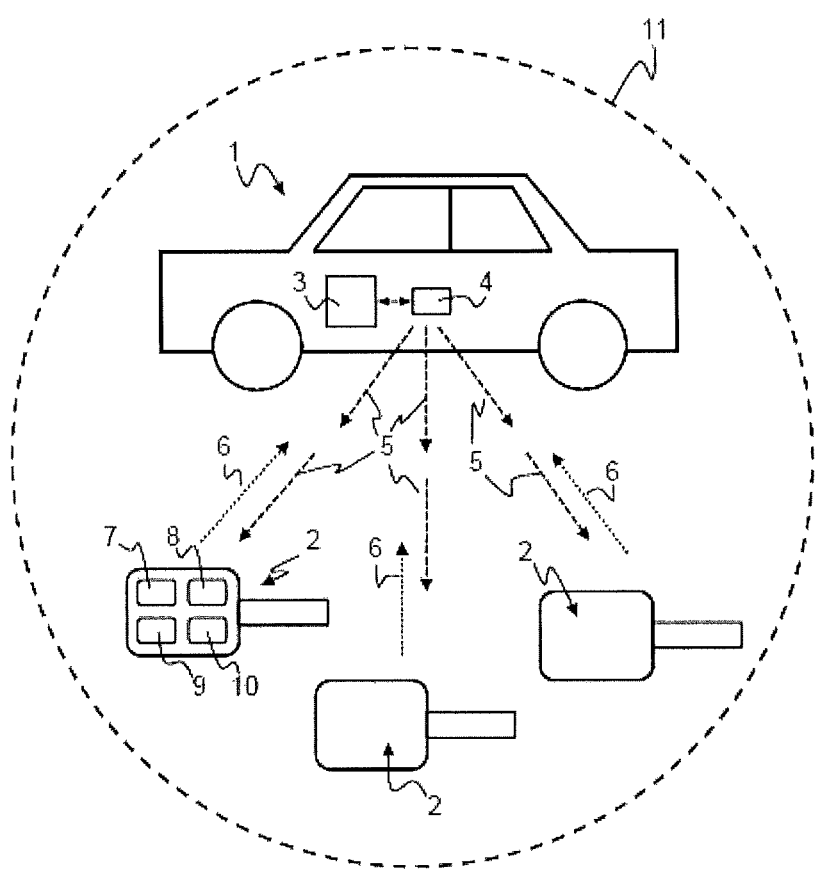

METHOD AND DEVICE FOR PROGRAMMING A PLURALITY OF KEYS TO AN AUTHORIZATION DEVICE OF A VEHICLE

CROSS REFERENCE TO RELATED APPLICATIONS

This application is based on and hereby claims priority to International Application No. PCT/EP2012/002389 filed on Jun. 5, 2012 and German Application No. 10 2011 103 674.5 filed on Jun. 9, 2011, the contents of which are hereby incorporated by reference.

BACKGROUND

Method and apparatus for teaching a plurality of keys to an authorization device in a vehicle, wherein the keys that are in a reception range of a transmission unit of the authorization device receive a test signal from said authorization device and transmit a response signal to the authorization device in response to said test signal.

Such methods and apparatuses are used in vehicle construction to teach the keys associated with a vehicle to an authorization device that is used for theft prevention, particularly an engine immobilizer. The keys taught are then authorized to start up the vehicle. To this end, the keys each have an integrated transponder that can set up a radio link to a transmission unit in the authorization device for the interchange of data telegrams.

The currently most widely used method for teaching a plurality of keys to an authorization device in a vehicle provides for the transmission unit of the authorization device to transmit a teaching signal and for all the keys that are in the reception range to respond thereto, with only that key with the strongest response signal being recognized by the authorization device. As a result, the keys need to be brought into the proximity of the transmission unit in succession, the result of which is many manual interventions and a long process time.

DE 10 2008 052 239 A1 discloses a method for automatically teaching a plurality of keys to an engine immobilizer in a vehicle, wherein each key is assigned a different address in advance and during the teaching the respective key is selectively addressed by the engine immobilizer using the assigned address. This method therefore requires an upstream step in which the keys intended for the vehicle need to be assigned individual addresses. This extends the period of time for teaching the keys and there is a need for manual interventions in the procedure.

The generic DE 101 12 573 A1 describes a method for initializing a theft prevention system for a motor vehicle, wherein the theft prevention system first of all transmits a test signal. Each encoder that receives the test signal produces a transmission time that is characteristic of the respective encoder using a random principle, and a response signal is then transmitted within this transmission time. If it is not possible to distinguish between all the encoders, for example because two or more encoders have produced an identical transmission time, then the method starts afresh for the indistinguishable encoders until all the encoders have been recognized. The use of a random principle means that there is therefore always the possibility for a plurality of method cycles to have to be performed until all the encoders have been recognized.

SUMMARY

Therefore, one possible object is to provide a method and an apparatus for quickly and reliably teaching a plurality of keys to an authorization device in a vehicle using as few manual interventions as possible.

The inventors propose a method for teaching a plurality of keys to an authorization device in a vehicle, which comprises:
 a test signal is transmitted by the authorization device;
 a signal parameter of the test signal that is dependent on the physical location of the key is measured by the keys that are in the reception range;
 a key-specific time window is ascertained on the basis of the signal parameter by the respective keys;
 a response signal is sent in the key-specific time window by the respective keys and the response signals are recorded in the authorization device.

Since each key that is in the reception range of the test signal independently measures the at least one signal parameter that is dependent on the physical location of the key and ascertains a key-specific time window therefrom, there is the assurance that the response signals from the keys do not overlap. The signal parameter is directly dependent on the location of the key in space, which can never be identical for two keys. Therefore, it is also not possible for two identical time windows to be obtained, even if each key itself independently ascertains said time window according to the same criteria. The manual involvement for teaching a plurality of keys is thereby reduced since the keys to be taught merely need to be brought into the reception range and the method started. The authorization device records the successively incoming response signals and keeps these keys for future authorization requests as authorized. In this context, keys can be understood to mean all means that can be carried by a user and used for radio-assisted establishment of the use authorization for the vehicle.

In one preferred embodiment of the method, the response signal contains an identification code that is characteristic of the respective key. The identification code embedded in the response signal can be used by the authorization device to draw conclusions as to the sending key.

In one preferred embodiment of the method, the key-specific time window is calculated from the signal parameter using a mathematical algorithm. The mathematical algorithm is the same for all keys and is designed such that it is not possible for identical time windows to be obtained for keys at different physical positions.

In one preferred embodiment of the method, the signal parameter is formed by a value that represents the field strength of the test signal. The field strength of the test signal is particularly well suited as a signal parameter, since it is always changing over the physical profiles.

An apparatus for teaching a plurality of keys to an authorization device in a vehicle, wherein the keys that are in a reception range of a transmission unit of the authorization device receive a test signal from said authorization device and wherein the respective key ascertains a key-specific time window from at least one signal parameter of the test signal that is dependent on the physical location of the key, during which the respective key transmits a response signal that can be received by the transmission unit and recorded by the authorization device.

For the purpose of implementing the proposed method, an apparatus is shown that has an authorization device with a transmission unit. The transmission unit is preferably equipped with a coil for receiving and sending radio waves. When the method is started, the transmission unit transmits a test signal over a physically limited reception range. All the keys that are in this reception range receive this signal and measure at least one particular signal parameter therefrom. Each key then independently ascertains a time window for its response signal and transmits the response signal during this time window. The response signals are successively received by the transmission unit and forwarded to the authorization device for permanent recording.

In one preferred embodiment of the apparatus, the signal parameter represents a value of the field strength, particularly a field strength vector, of the test signal. The field strength alters from the transmission unit over the physical profile and can very easily be measured by the keys. When a field strength vector is used, an even more precise signal parameter is obtained. In this regard, either the strongest spatial axis can be used or an average can be formed from the three spatial axes.

In one preferred embodiment of the apparatus, the keys each have a transponder, a computation unit, a non-volatile memory and an energy source. The energy source is preferably in the form of a battery and supplies electric power to the connected components. An alternative embodiment provides for the energy source to be in the form of a capacitor that can be wirelessly charged by a coil pair comprising a vehicle coil and a key coil as required. The transponder is used for sending and receiving data telegrams, particularly for the request signal and for the response signal, by radio waves. The non-volatile memory contains, inter alia, the identification code of the key and the algorithm for converting the signal parameter into a time window. The computation unit controls the operation of the components and performs the mathematical transformations.

In one preferred embodiment of the apparatus, the authorization device is in the form of an engine immobilizer. When it is intended that the vehicle be started up, the engine immobilizer checks whether an authorized key is being used for this and, depending on the result of the check, enables or denies the starting process.

BRIEF DESCRIPTION OF THE DRAWINGS

These and other objects and advantages of the present invention will become more apparent and more readily appreciated from the following description of the preferred embodiments, taken in conjunction with the accompanying drawing of which:

In the drawing, the FIGURE shows a schematic illustration of an apparatus for teaching a plurality of keys to an authorization device in a vehicle.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

According to the FIGURE, a vehicle 1 has an authorization device 3 for preventing start up of the vehicle 1 by unauthorized users, which is connected to a transmission unit 4. The transmission unit 4 transmits a test signal 5, which can be initiated manually, that is received by all the keys 2 that are in a reception range 11. Each key 2 has an energy source 10, preferably in the form of a battery, that supplies electric power to a transponder 7, a computation unit 8 and a non-volatile memory 9. The memory 9 stores an identification code, which is characteristic of the respective key 2, and a mathematical algorithm. The transponder 7 is used for receiving and sending data telegrams by radio waves. The field strength of the test signal 5 that is ascertained by the transponder 7 is transmitted to the computation unit 8, which in turn uses the algorithm to calculate a key-specific time window. The transponder 7 transmits the identification code from the memory 9 to the transmission unit 4 in the form of a response signal 6 during the time window. The transmission unit 4 receives the response signals 6 from the keys 2 and forwards them to the authorization device 3 for recording. From that time on, the authorization device 3 will keep the recorded keys 2 as authorized for starting up the vehicle 1.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for teaching a plurality of keys to an authorization device in a vehicle, comprising:
    transmitting a test signal to keys in a reception range of the authorization device, the test signal being transmitted by the authorization device;
    measuring a location dependent signal strength of the test signal, the signal strength being measured by the keys in the reception range such that each key in the reception range has a respective signal strength measurement dependent on a physical location of the key;
    for each key in the reception range, ascertaining a key-specific time window based on the respective signal strength measurement such that each key in the reception range has a respective key-specific time window;
    for each key in the reception range, sending a response signal in the respective key-specific time window; and
    recording each response signal in the authorization device.

2. The method as claimed in claim 1, wherein
    each response signal contains an identification code that is characteristic of the key in the reception range that sent the response signal, such that the authorization device records identification codes of authorized keys.

3. The method as claimed in claim 2, wherein
    when an ignition key attempts to start the vehicle, the authorization device compares an identification code of the ignition key with the identification codes of the authorized keys, and
    if the identification code of the ignition key matches one of the identification codes of the authorized keys, the vehicle is started.

4. The method as claimed in claim 1, wherein each key-specific time window is calculated from the respective signal strength measurement using a mathematical algorithm.

5. The method as claimed in claim 3, wherein each key-specific time window is calculated from the respective signal strength measurement using a mathematical algorithm.

6. An apparatus in a vehicle, comprising:
    an authorization device having a transmission unit to transmit a test signal; and
    a plurality of keys in a reception range of the transmission unit of the authorization device, to receive the test signal from the authorization device, wherein
    each key in the reception range ascertains a respective key-specific time window from a signal strength of the test signal that is dependent on a physical location of the key,
    each key in the reception range transmits a response signal during the respective key-specific time window,
    the transmission unit receives each response signal, and the authorization device records each response signal such that the keys in the reception range are taught to the authorization device.

7. The apparatus as claimed in claim 6, wherein the signal strength is measured as a field strength vector.

8. The apparatus as claimed in claim 6, wherein the keys each have a transponder, a computation unit, a non-volatile memory and an energy source.

9. The apparatus as claimed in claim 6, wherein the authorization device is an engine immobilizer.

10. The apparatus as claimed in claim 7, wherein the keys each have a transponder, a computation unit, a non-volatile memory and an energy source.

11. The apparatus as claimed in claim 10, wherein the authorization device is an engine immobilizer.

* * * * *